United States Patent [19]

Gustafsson

[11] 4,201,631
[45] May 6, 1980

[54] METHOD FOR CONTROLLING THE FLOW THROUGH A DISTILLATION APPARATUS AND A DEVICE FOR CARRYING OUT THE METHOD

[75] Inventor: Berth U. Gustafsson, Österskär, Sweden

[73] Assignee: Projectus Industriprodukter Aktiebolag, Bromma, Sweden

[21] Appl. No.: 913,218

[22] Filed: Jun. 6, 1978

[51] Int. Cl.² .............................................. B01D 3/42
[52] U.S. Cl. .......................................... 203/1; 203/2; 203/99; 203/100; 203/DIG. 4; 202/176; 202/181
[58] Field of Search ................. 203/10, 11, 26, 20, 203/DIG. 4, 100, 1, 2, DIG. 25, 99; 202/181, 170, 206, 160, 235, 176; 62/324 C, 178

[56] References Cited

U.S. PATENT DOCUMENTS

| | | | |
|---|---|---|---|
| 1,466,670 | 9/1923 | Monti | 203/DIG. 4 |
| 3,020,214 | 2/1962 | Beduhn et al. | 203/20 |
| 3,308,877 | 3/1967 | Gerteis | 62/29 |
| 3,532,606 | 10/1970 | Sibert | 202/206 |
| 4,003,798 | 1/1977 | McCord | 203/DIG. 4 |

FOREIGN PATENT DOCUMENTS 740014 10/1943 Fed. Rep. of Germany .......... 202/206

Primary Examiner—Wilbur L. Bascomb, Jr.
Attorney, Agent, or Firm—Birch, Stewart, Kolasch & Birch

[57] ABSTRACT

A method and a device for controlling the flow through a distillation apparatus for separating components of a mixture, particularly a dissolved substance, such as an oil, a wax, a polishing agent or alike, from a liquid mixture, particularly containing a chlorinated solvent, such as tri- or perchlorethylene. According to the present invention, the feeding of new liquid mixture or solution into the boiling vessel of the distillation apparatus is controlled in response to the liquid level in the boiling vessel, whereas the draining of substance-enriched liquid or separated substance from the boiling vessel is controlled in response to the distillation temperature, or to a variable being co-variant therewith, so as to maintain the distillation temperature within predetermined limits and the flow through the apparatus at an optimal, high level.

7 Claims, 2 Drawing Figures

METHOD FOR CONTROLLING THE FLOW THROUGH A DISTILLATION APPARATUS AND A DEVICE FOR CARRYING OUT THE METHOD

BACKGROUND OF THE INVENTION

The present invention relates to a method and a device for controlling and possibly also accelerating the flow through a preferably continuously operating distillation apparatus for separating components of a mixture, particularly a dissolved substance, such as an oil, a wax, a polishing agent or alike from a liquid mixture, containing particularly a chlorinated solvent, such as tri- or perchlorethylene, wherein, by using the heat pump principle, the heat emitted upon condensation of the distillate is transferred to the vaporizer of a refrigeration circuit, in which the refrigeration fluid by means of additional compressor work returns this heat via a condensor of the refrigeration circuit to the boiling liquid.

In times of rapidly rising prices of solvents and concern about the environment, there are good reasons to increasingly distillate and re-circulate various solvents. The reuse of solvents by a distilling process is nothing new in itself. Traditionally, this is done to recover chlorinated solvents in various washing processes, in which e.g. tri- or perchlorethylene is used as a solvent.

Heretofore, distilling has generally been performed by electrical heating or hot water or steam as a heating medium, and air or water as a cooling medium. However, in the literature of refrigeration technology, examples have been generally given as to distillation by using the heat pump principle. Consequently such a method per se is not a novel concept.

The object of the invention, however, is to achieve a more energy-saving, automatically operating system, particularly for a continuous operation. In the first place, the system should enable the distillation of solvents of the kind including tri- and perchlorethylene or freones, but it should also be possible to use the system for other distillable liquids.

The boiling point of a liquid to be distilled is generally dependent on how many and to what degree other substances are carried as a solute. In case of washing products in the mechanical engineering industry, the solute is mostly an oil, a wax or some polishing agent. These solutes influence the boiling temperature in such a way that e.g. an increased percentage of mineral oil dissolved in the washing liquid raises the boiling temperature most considerably. For instance, in case of mineral oil dissolved in trichlorethylene, the boiling temperature will progressively increase from about 87° C. at zero mineral oil contents to about 110° C. at a mineral oil percentage of 60% by volume. In order to simplify matters, the discussion below will concern trichlorethylene as a solvent and mineral oil dissolved therein.

In a distillation process, it is important that the necessary heat is not supplied at a temperature being so high that the solvent will be thermally disintegrated. In case of trichlorethylene, it is necessary not to expose the solution to a temperature above 100° C. This means, that when distilling trichlorethylene, the mineral oil percentage must not exceed about 45% by volume. In practice, the mineral oil percentage should not exceed 30% by volume.

Even the weight or density of the liquid is dependent on the mineral oil percentage. Thus, the specific weight or density decreases linearly from a value of 1.5 for pure trichlorethylene to 0.9 for pure mineral oil, and the difference in density of different oil mixtures is such that it can be used for separating solvents having respectively a high and a low oil percentage in the distiller.

SUMMARY OF THE INVENTION

In view of the above considerations, there is provided, according to the present invention, a method and a device, wherein the feeding of new liquid mixture or solution into the boiling vessel is controlled in response to the liquid level in the boiling vessel, whereas the draining of substance-enriched liquid or separated substance from the boiling vessel is controlled in response to the distillation temperature (or to a variable being co-variant therewith) so as to keep the distillation temperature within predetermined limits and the flow through the apparatus at an optimal, high level.

BRIEF DESCRIPTION OF THE DRAWINGS

The invention is explained more fully below with reference to the accompanying drawings illustrating an embodiment of a device according to the present invention.

DESCRIPTION OF AN EXEMPLARY EMBODIMENT

Figure 1:
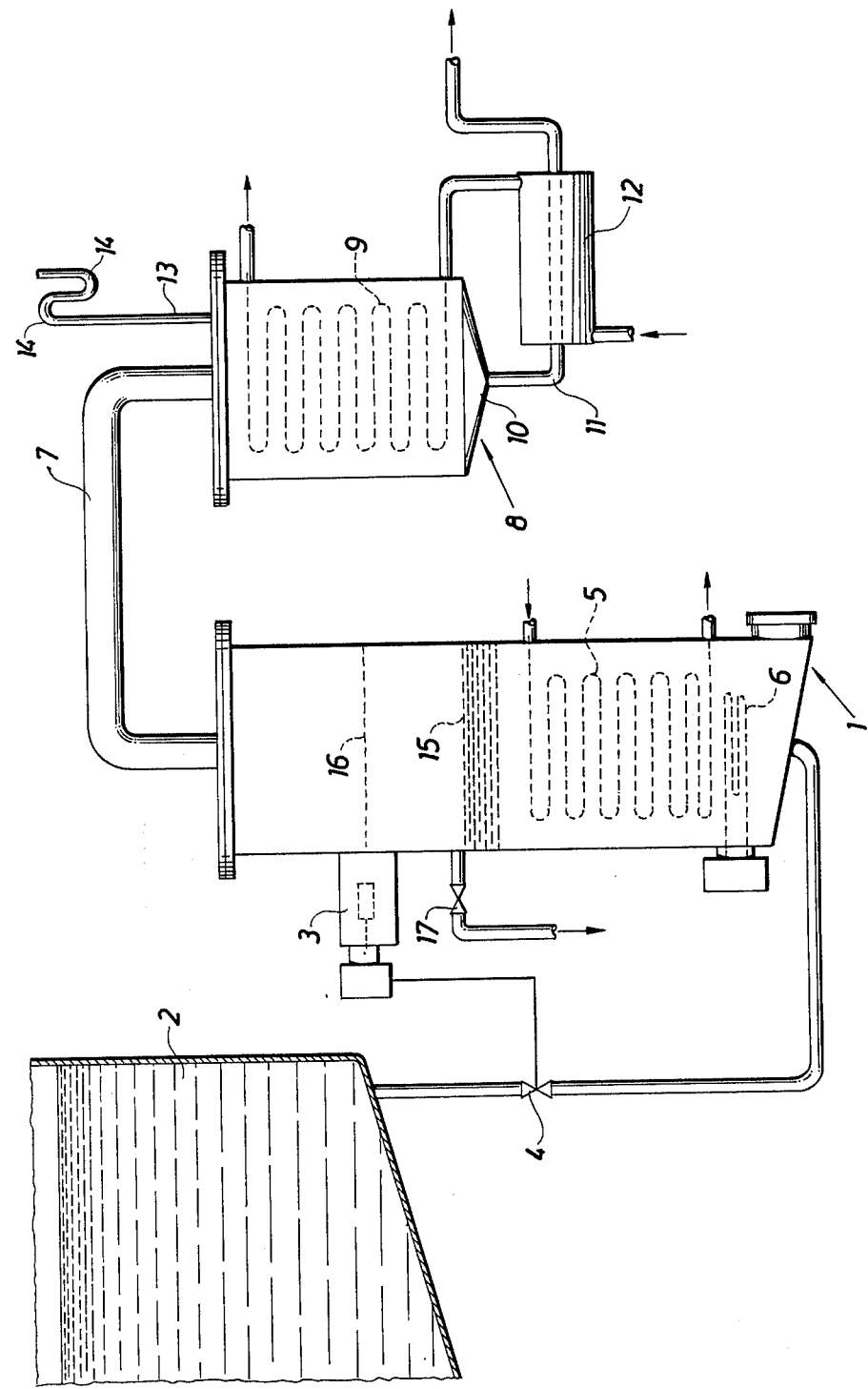
FIG. 1 shows schematically a distillation apparatus according to the present invention comprising a boiler and a condensor.

The distillation apparatus shown in FIG. 1 comprises a boiling vessel 1, which is filled with an oil-containing solution from a storage tank 2. The boiling vessel is level controlled, with a feed valve 4 being controlled by a level sensor 3. The boiling vessel 1 includes a heat exchanger 5 to effect heat transfer between the refrigeration medium in a refrigeration circuit (compare FIG. 2) and said solution. To facilitate the start of the distilling process, a heating element 6 is disposed in the boiling vessel 1 for initially heating the newly filled liquid up to a temperature close to the boiling point. The upper part of the boiling vessel is connected to a vapor conduit 7 for conducting the solvent vapor into a condensor 8, wherein a cooling coil 9 of said refrigeration circuit is disposed. The bottom 10 of the condensor vessel has an outlet for the condensed solvent, and the outlet conduit 11 has a configuration so as to define a liquid trap. The latter is provided with a cooling device 12 resulting in a certain undercooling of the distillate. Since both vessels 1, 8 are initially filled with air, the condensor vessel 8 is provided with a venting pipe 13. The venting pipe is uncooled and provided with suitable bends 14, so that a liquid trap is established. Normally, the solvent vapor is heavier than air and will consequently push the air into the condensor vessel 8, whereby the air escapes through the venting pipe 13.

The distillation proceeds in such a way that the solvent boils while being heated by the heat exchanger 5 in the boiler 1. Now, vapor bubbles will rise vertically in the liquid and, preferably, meet horizontal sieve plates 15 disposed above the heat exchanger 5, so as to effect a certain distribution over the cross-section of the boiler. When the vapor bubbles reach the free surface 16 of the liquid, the vapor leaves the boiler via the vapor conduit 7. Due to the difference in density between solvents having different oil contents, the oil-richest solvent will assemble at the top, i.e. adjacent the free surface 16 of the liquid. The purpose of the sieve plates 15 is to avoid too much internal circulation in the boiler vessel 8. Consequently, an enrichment of oil will take place in the upper part of the boiler. Thus, solvent having high oil contents can be drained from the region above the sieve plates 15 via a drain valve 17. The boiling temperature will successively tend to rise during the distillation process, since an enrichment of mineral oil takes place in the solution. However, the distillation temperature is preferably maintained substantially constant by draining the enriched solvent and feeding solvent with less oil content into the vessel 1. Thus, the draining should preferably be temperature controlled, which can be achieved by controlling the draining valve 17 by means of a high pressure pressostat in the refrigeration circuit (FIG. 2), as will be discussed further below. Since the solvent will be distilled and transferred as a vapor to the condensor 8 and, consequently, a reduction of volume will result in the boiler, and since the oil-enriched solvent is drained from the volume above the sieve plates 15, a sinking liquid level will be sensed by the float of the level sensor 3. Then, the float will open the feed valve 4 for the oil-containing solution from the store tank 2 so as to re-instate the liquid level 16. This solution has a higher density than the oil-enriched solution still remaining in the boiler and will therefore remain substantially in the lower part of the boiler.

Figure 2:
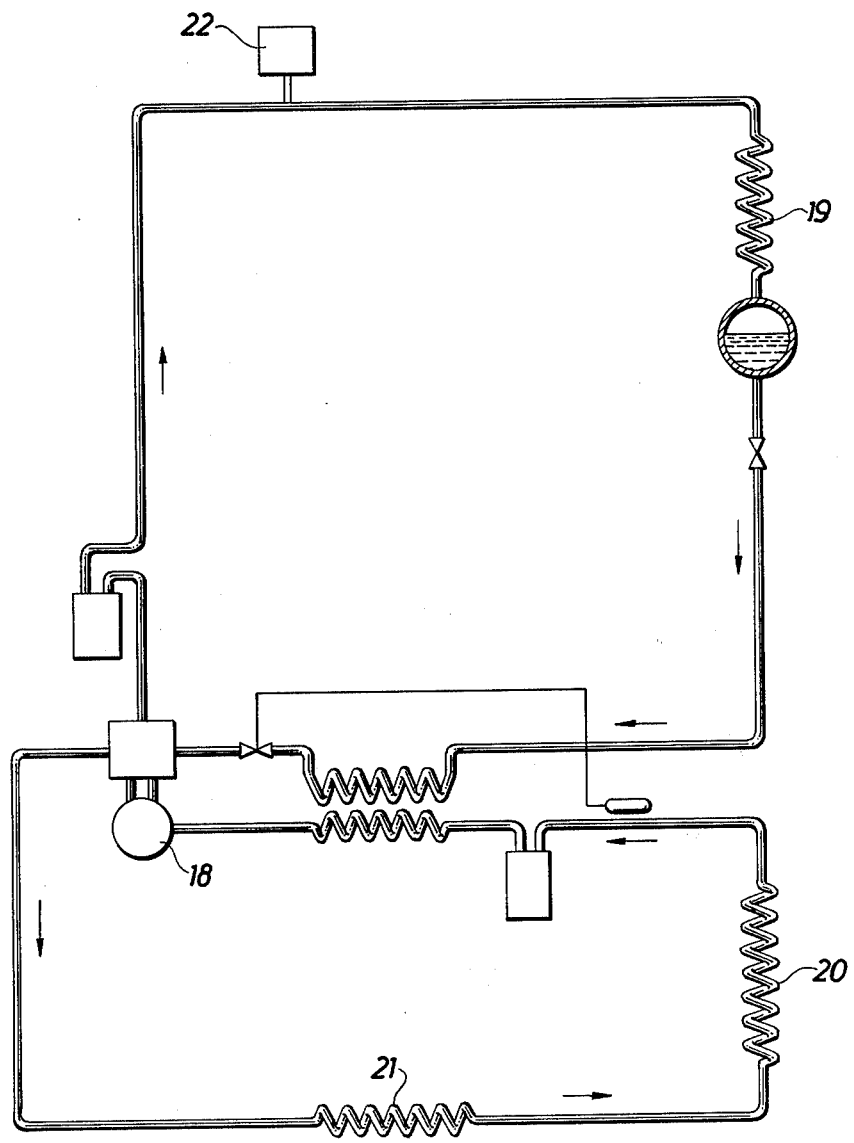
FIG. 2 shows likewise schematically, a refrigeration circuit co-operating with the boiler and the condensor of FIG. 1.

The purpose of the refrigeration circuit shown in FIG. 2 is to continuously transfer heat energy, which is freed during the condensation of the solvent in the condensor 8, to the boiler 1, where the heat energy is re-used. Since the temperature level in the condensor 8, in which the heat energy is freed, is lower than in the boiler 1, mechanical work is required for such an energy transfer according to the second law of thermodynamics. This mechanical work is supplied by the motor of the cooling compressor and is directly proportional to the temperature difference between the boiler and the condensor. In case a pure solvent having no contents of oil were to be distilled, the temperature difference would be practically insignificant, and the distillation could be carried on with minimal compressor work. However, in this practical case, the contents of mineral oil in the solvent will cause an increase of the boiling point and, therefore, a greater temperature difference and, also, an increase of the necessary compressor work. As an average, however, when actually performing the distillation in a suitably designed apparatus, a compressor work of 1 kWh would suffice for the transfer of 6–8 kWh of heat from the solvent condensor 8 to the boiler 1. This means a substantial energy saving as compared to the direct distillation method using electrical heating, hot water or steam. Moreover, conventional apparatus usually require cooling of the solvent condensor with water, which is not necessary in the apparatus of the present invention. Since cooling water is rather costly today, another saving is obtained hereby.

The refrigeration circuit is shown in FIG. 2. When distilling e.g. trichlorethylene a compressor 18 of the so called open type is preferably used, the compressor having a cylinder head being cooled by the refrigeration medium to reduce the thermal strain on the refrigeration medium side thereof. The rest of the refrigeration circuit is conventional with a condensor 19, which in this case corresponds to the boiler heat exchanger 5. The refrigeration medium condensates in the heat exchanger 5 of the boiler 1 and delivers its condensation heat to the solvent. The vaporizer 20 of the refrigeration circuit corresponds to the cooling coil 9 in the solvent condensor 8. The vaporizer 20 thus absorbs heat from the condensating solvent and this heat is returned to the boiling solvent in the boiling vessel 1. The refrigeration circuit furthermore includes a heat exchanger 21 (corresponding to the above-mentioned cooling device 12) on the solvent distillate side, so that the solvent is suitably undercooled.

As mentioned above, the flow through the distillation apparatus is controlled partially by feeding new liquid to the boiling vessel 1 to such an extent that the liquid level 16 is maintained substantially constant, partially by draining oil-enriched liquid in response to the distillation temperature so as to keep the latter within predetermined limits securing a high capacity as well as eliminating the risk of thermal disintegration of the liquid.

Of course, the distillation temperature can be measured directly, e.g. in the vapor conduit 7, and control of the draining valve 17 can be made by means of ordinary actuating devices. In this case, however, it is advantageous to use the refrigeration circuit and arrange a pressure sensor 22 in the high pressure part of the refrigeration circuit, since the pressure of the refrigeration medium (at constant compressor power) increases considerably when the distillation temperature rises, and vice versa. Thus, the pressure sensor 22 can control the draining valve by means of ordinary actuating devices and with great sensitivity, either continuously or intermittently, e.g. by means of a relay (not shown). In case of rising distillation temperature and refrigeration medium pressure, the draining valve 17 shall consequently be actuated in an opening direction, so that the oil-enriched liquid is drained and the boiling temperature therefore decreases again, and vice versa. Thus, the distillation temperature can be regulated to a desired (high) value to ensure as high a capacity as possible.

The capacity will also be increased by the sieve plates 15 arranged in the boiling vessel 1, these plates serving to inhibit internal circulation and to secure the formation of different liquid layers in the vessel and to accelerate the enrichment of the substance (e.g. oil) to be separated from the liquid (e.g. the solvent).

I claim:

1. A method for controlling the flow through a distillation system including a boiling vessel containing a liquid mixture, a condensing vessel and a refrigeration circuit provided with a compressor means and containing a refrigeration medium, said refrigeration circuit being operatively associated with said boiling vessel and said condensing vessel, wherein a substance is separated from said liquid mixture which has a boiling point and density dependent upon the contents of said substance in said liquid mixture, which comprises introducing fresh liquid mixture into the boiling vessel in response to the liquid level in the boiling vessel, and removing a liquid enriched in said substance in a controlled manner from the boiling vessel in response to the pressure of the refrigeration medium, which increases in accordance with an increase in the distillation temperature, wherein the heat emitted upon the condensation of the distillate in the condenser vessel is transferred to the refrigeration medium in the refrigeration circuit and the refrigeration medium is returned by additional compressor work of said compressor to the boiling vessel where said heat is transferred to the liquid mixture.

2. The method of claim 1 wherein the removal of the liquid enriched in said substance is controlled in response to the pressure of said refrigeration medium at the high pressure side of the compressor of the refrigeration circuit.

3. The method of claim 1 wherein the substance enrichment in the boiling vessel is accelerated by inhibiting the circulation of the liquid mixture within the boiling vessel.

4. A distillation system including an apparatus for controlling the flow through said distillation system which comprises a boiling vessel, liquid inlet means for introducing a liquid mixture into said boiling vessel, liquid outlet means for removing a desired liquid from the boiling vessel, a condensing vessel, vapor conduit means connecting the boiling vessel with the condensing vessel and a refrigeration circuit provided with a compressor means, a pressure sensing means, and containing a refrigeration medium, said refrigeration circuit being operatively associated with said boiling vessel and said condensing vessel for transferring heat emitted upon the condensation of the vapor in the condensing vessel to the refrigeration medium in the refrigeration circuit, and returning the refrigeration medium by additional compressor work of said compressor to the boiling vessel where said heat is transferred to the liquid mixture, and a liquid level sensor means operatively associated with the boiling vessel, said liquid level sensor means connected with said inlet means for controlling the introduction of fresh liquid mixture into the boiling vessel, wherein the removal of a desired liquid from the boiling vessel is controlled in response to the pressure of the refrigeration medium as measured by the pressure sensor, which increases in accordance with an increase in the distillation temperature.

5. The distillation system of claim 4 wherein the pressure sensor is disposed on the pressure side of the compressor.

6. The distillation system of claim 4 wherein circulation inhibiting means are disposed in the boiling vessel.

7. The distillation system of claim 6 wherein the circulation inhibiting means are a plurality of sieve plates which extend across the boiling vessel below the liquid level.

* * * * *